United States Patent

Rubenstein

[15] 3,703,608

[45] Nov. 21, 1972

[54] AMPLIFIER SWITCHING MEANS FOR A TELEPHONE ANSWERING DEVICE

[72] Inventor: Leonard Rubenstein, London, England

[73] Assignee: Learning Appliances Limited, London, England

[22] Filed: Sept. 17, 1970

[21] Appl. No.: 73,162

[30] Foreign Application Priority Data

Sept. 19, 1969 Great Britain..........46,246/69

[52] U.S. Cl...............................179/6 R, 179/100.2 Z

[51] Int. Cl...........................H04m 1/64, G11b 23/04

[58] Field of Search.....179/6 R, 6 AC, 6 C, 100.2 R, 179/100.2 Z; 242/186, 191, 57; 274/4 D, 11 D

[56] References Cited

UNITED STATES PATENTS

| | | | |
|---|---|---|---|
| 2,284,173 | 5/1942 | Soukup | 179/6 R |
| 2,063,323 | 12/1936 | Mallina | 179/6 R |
| 2,754,358 | 7/1956 | Fontaine | 179/6 R |
| 2,082,303 | 6/1937 | Schiller | 179/6 R |
| 2,080,812 | 5/1937 | Fairbanks | 179/6 R |
| 2,673,242 | 3/1954 | Van De Venier | 179/6 R |

*Primary Examiner*—James W. Moffitt
*Assistant Examiner*—Raymond F. Cardillo, Jr.
*Attorney*—Delio & Montgomery

[57] ABSTRACT

A sound recording and reproducing machine which has a normal mode of operation wherein a tape is driven from a supply spool to a take-up spool at a speed suitable for reproducing or recording information on the tape and a series of switching operations are performed in synchronism with the movement of tape past a sound recording and reproducing head. To achieve synchronsim a switching shaft is coupled to one of the spools and a switching mechanism is releasably coupled to the switching shaft. The switching shaft is rotated in synchronism with the spool throughout all modes of operation of the machine. The switching mechanism is only coupled to the shaft when the machine is operated in the normal mode of operation, thereby reducing loading on the spool during operation in other modes.

12 Claims, 6 Drawing Figures

INVENTOR
Leonard Rubenstein
BY Dexlo and Montgomery
ATTORNEYS

PATENTED NOV 21 1972 SHEET 2 OF 5 3,703,608

INVENTOR
Leonard Rubinstein
BY DeLio and Montgomery
ATTORNEYS

INVENTOR
Leonard Rubenstein
BY DeLio and Montgomery
ATTORNEYS

INVENTOR
Leonard Rubenstein
BY DeLio and Montgomery
ATTORNEYS

INVENTOR
Leonard Rubenstein
BY Dodo and Montgomery
ATTORNEYS

AMPLIFIER SWITCHING MEANS FOR A TELEPHONE ANSWERING DEVICE

BACKGROUND OF THE INVENTION

This invention relates to sound recording and reproducing machines.

In our U.S. Pat. No. 3,539,728, there is disclosed a telephone answering machine wherein telephone answering announcements and incoming messages are recorded on a single tape. To set up the machines the user records a series of announcements at spaced intervals along the tape. When the machine is subsequently connected to a telephone line an incoming ringing current first actuates the machine to operate in a "playback" mode, wherein one of the recorded announcements is transmitted to the line. At the end of the announcement the machine is switched to a "record" mode wherein a message transmitted from the caller is recorded on a section of tape intermediate the recorded announcements.

To ensure that switching between the "playback" and "record" modes is effected in synchronism with the passage of tape past a sound recording and reproducing head of the machine there is provided a switching mechanism which is coupled to one of the tape spools.

A similar requirement for synchronism between the movement of a tape and predetermined switching operations arises in machines wherein the passage of tape is synchronized with operation of a visual display provided by an optical projector.

STATEMENT OF THE INVENTION

The present invention consists in sound recording and reproducing machine comprising means for supporting take-up and supply spools for magnetic recording tape, a sound recording and reproducing head, means for driving tape between the supply and take-up spools, a rotary switching element which is coupled to one of the spools for rotation in synchronism therewith, a switching mechanism and means for releasable coupling the switching mechanism to the switching element, whereby in one mode of operation of the machine the tape driving means are energized to drive tape forwardly from the supply spool to the take-up spool at a speed suitable for recording or reproducing information on the tape and rotation of the switching element causes the switching mechanism to perform a predetermined sequence of switching operations in synchronism with the movement of tape past the head whilst when the machine is operated in another mode the switching element is again rotated in synchronism with the movement of tape but does not effect any operation of the switching mechanism.

BRIEF DESCRIPTION OF THE DRAWINGS

The invention will now be described, by way of example, with reference to the accompanying drawings, in which.

Figure 1:
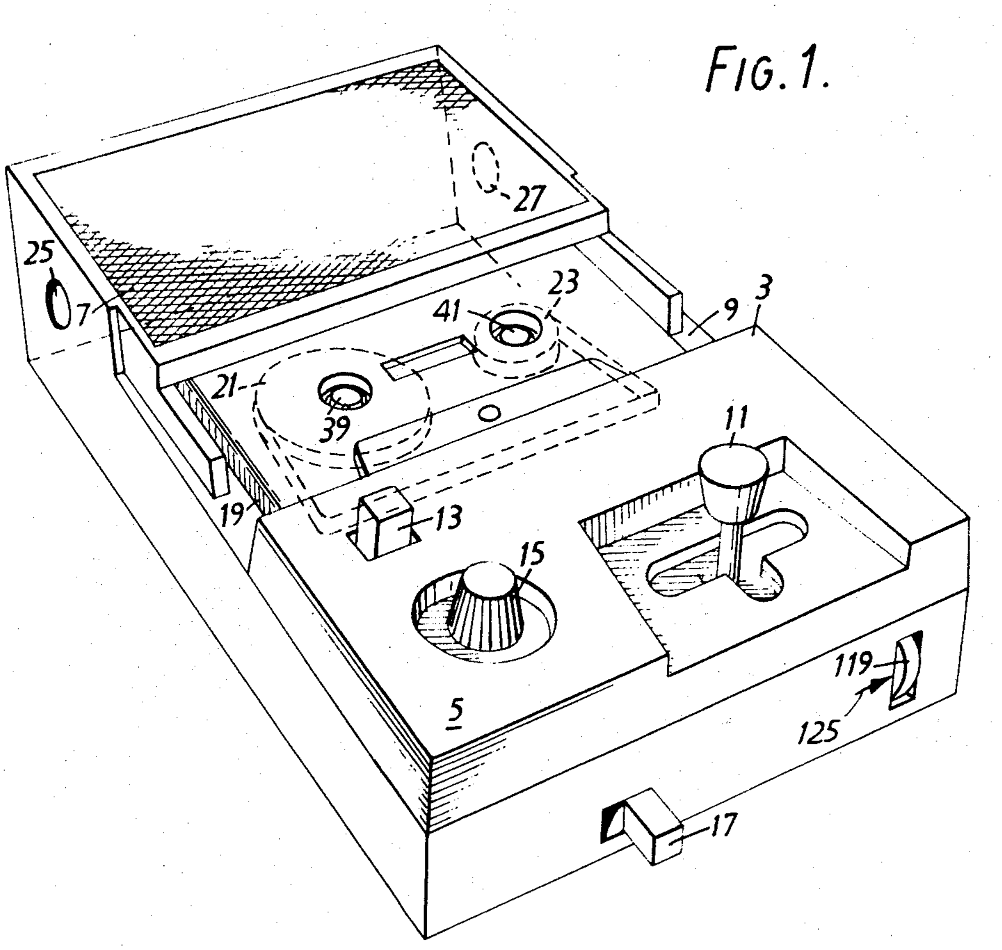
FIG. 1 is a perspective view from above of a telephone answering machine according to the invention.

The machine shown in the drawings is a tape recorder which can also be operated as a telephone answering machine. In operation as a telephone answering machine a single tape is used for recording both answering announcements and incoming messages, as in the machine disclosed in our aforementioned U.S. patent.

Referring to the drawings, the present machine has a main chassis 1 which is housed within a casing 3.

On the top of the casing 3 is a control panel 5, a speaker section 7, and a central section which serves as a tape deck 9. In the control panel 5 is a main operating switch 11, a record button 13 and an amplifier volume control 15. Below the panel 5 is a selector switch 17. The tape deck 9 is adapted to support a closed cassette 19 containing freely rotatable supply and take-up spools 21 and 23, respectively, for magnetic tape. At one side of the casing 3 there is a socket 25 for connecting a microphone to the machine and on the other side is a socket 27 for connecting the machine to a telephone line. Mounted on the chassis 1 are a tape driving mechanism 29, a sound recording and reproducing head 31, an amplifier 33, a speaker 35, a switching mechanism 37 for varying the electrical connections to the amplifier 33, an electrical circuit for supplying current to the tape driving mechanism 29 and amplifier 33, and a detector circuit for detecting an incoming ringing current. These electrical circuits are shown in FIG. 5.

Operation of the present machine as a tape recorder, the "normal" condition, or as a telephone answering machine, the "answer" condition, is determined by the position of the selector switch 17, which is a two-position switch operable between "normal" and "answer" positions. With the selector switch 17 arranged in either of these positions the main switch 11 can be moved from a "stop" position in which the tape driving mechanism 29 is inoperative, to a "play" position, in which tape is driven forward at normal speed for recording or playback, a "fast forward" position, in which tape is driven forwardly at high speed, or a "rewind" position, in which tape is rewound on to the supply spool 21.

Figure 2:
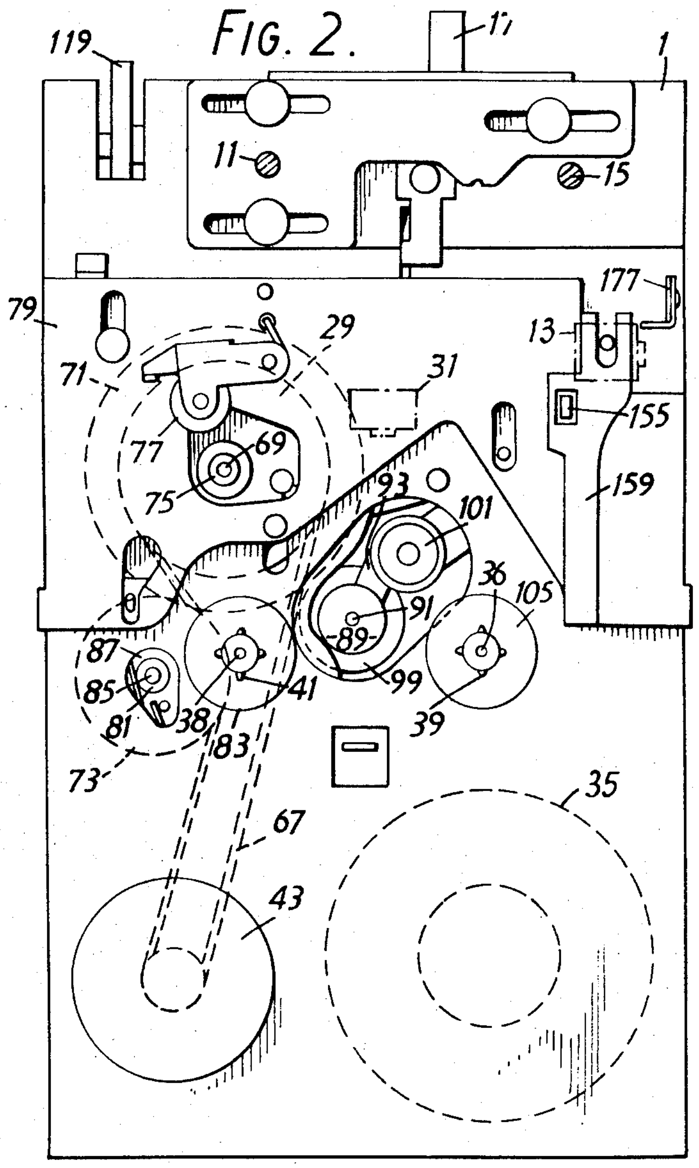
FIG. 2 is a plan view of the machine of FIG. 1 with an outer casing removed.
Figure 4:
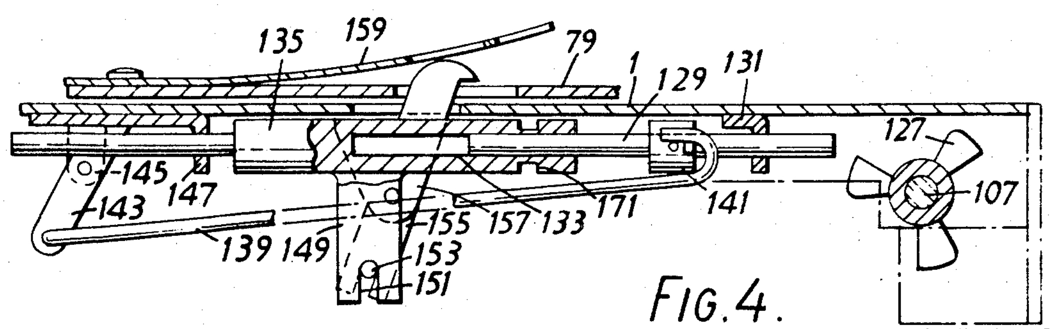
FIG. 4 is a section on the line IV—IV of FIG. 3.
Figure 3:
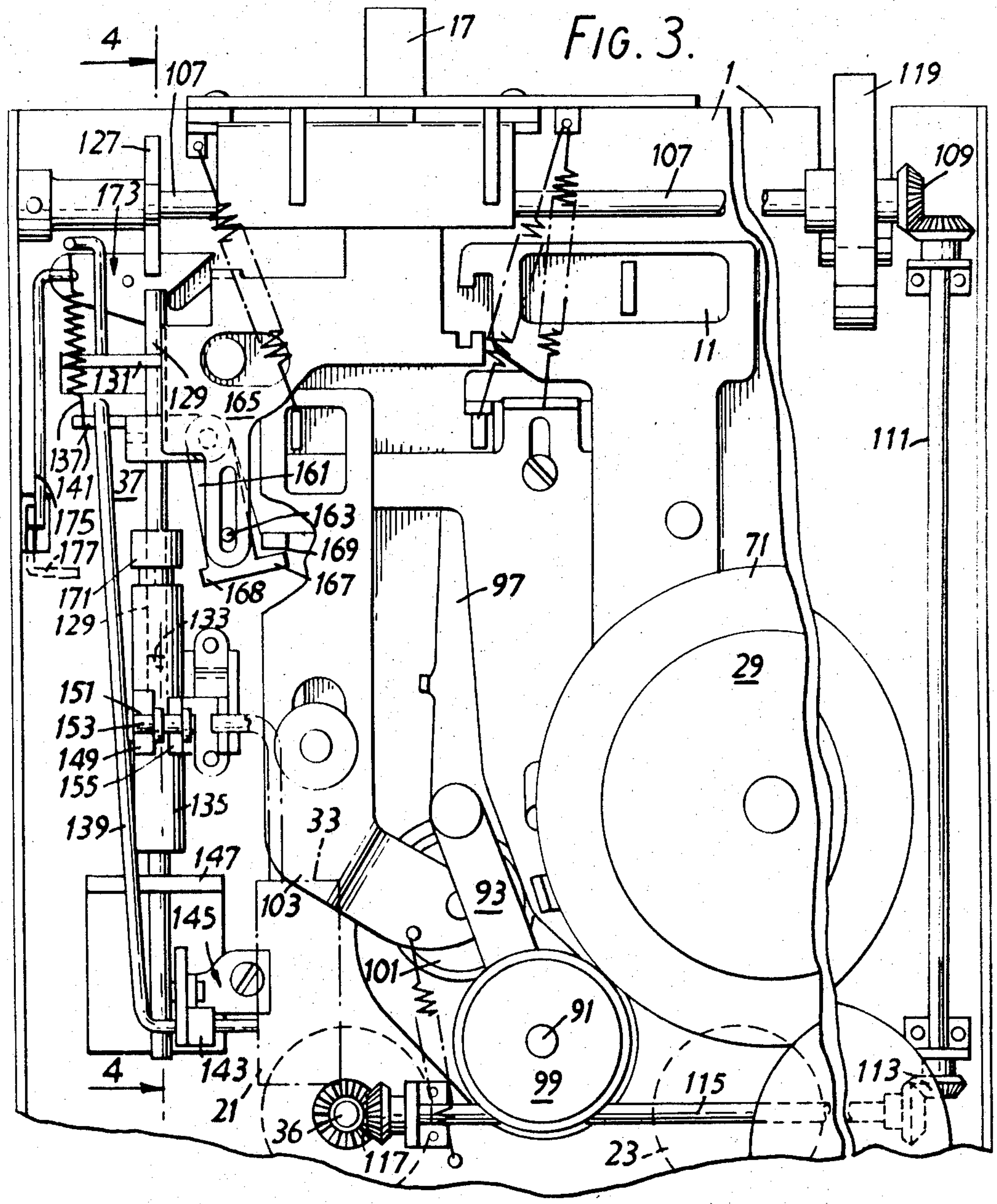
FIG. 3 is a fragmentary plan view from below of the machine of FIG. 1.

Referring now to FIGS. 2,3 and 4, the tape driving mechanism 29 includes two spindles 36 and 38, which extend upwardly from the chassis 1 into the tape deck 9. The cassette 19 on the tape deck 9 has its supply spool 21 engaged by a locating element 39 on spindle 36 and its take-up spool 23 engaged by a locating element 41 on spindle 38.

Figure 5:
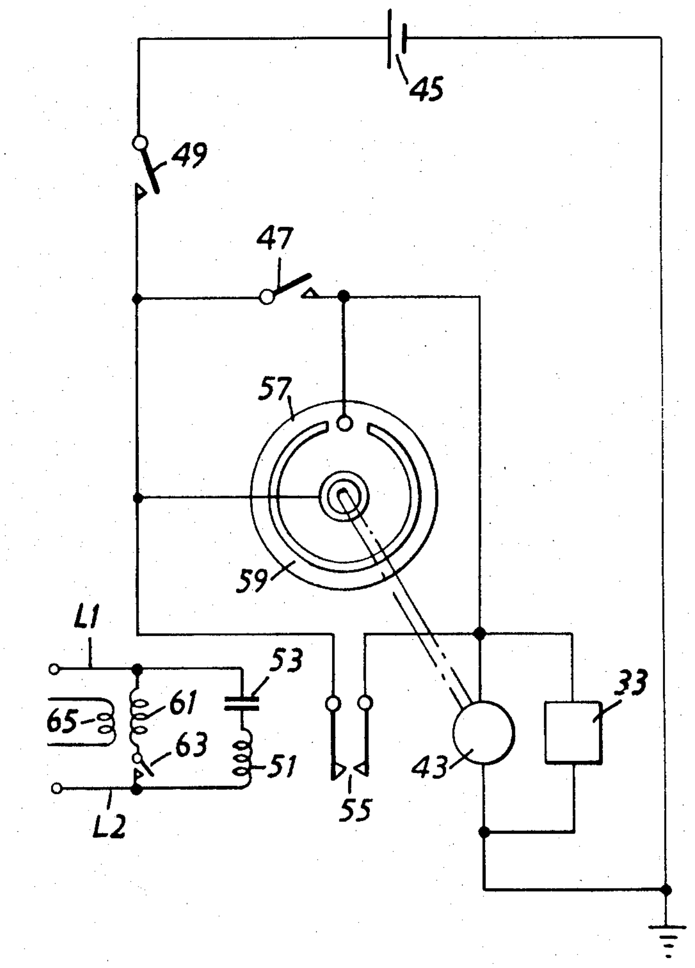
FIG. 5 is an electrical circuit in the machine of FIGS. 4 to 6.

Also included in the tape driving mechanism 29 is an electric motor 43 which is supplied with current by the electrical circuit shown in FIG. 5. Referring to this figure, the motor 43 and the amplifier 33 are connected together in parallel between the negative terminal of a battery 45 and one pole of a switch 47. The other pole of switch 47 is connected to the positive terminal of the battery 45 via a switch 49.

Switch 47 is closed when the selector switch 17 is moved to the "normal" position and switch 49 is closed when the main switch 11 is moved to its "play" position.

Also included in the circuit of FIG. 5 is the detector circuit mentioned above. This detector circuit includes a relay winding 51 and a capacitor 53 connected together in series between the conductors L1 and L2 of a telephone line when the machine is used for telephone answering purposes. Contacts 55 of the relay are connected in parallel with the switch 47. Also connected in parallel with the switch 47 is a rotary switch 57 which has a rotary element 59 thereof mounted on a shaft coupled to motor 43.

The conductors L1 and L2 of the line are connected together by a series circuit consisting of a primary winding 61 of a line transformer and a switch 63. Switch 63 is closed by operation of a cam on the above-mentioned shaft for rotary element 59 when an incoming ringing current is detected. A secondary winding 65 of line transformer is connected to the amplifier 33 by electrical connections, not shown in the drawings.

For transmitting drive from the motor 43 to parts of the tape-driving mechanism 29 hereinafter described an endless belt 67 couples an output shaft of the motor to a spindle 69 upon which is mounted a flywheel 71. The endless belt 67 also engages an idler roller 73, as hereinafter described.

Mounted at the upper end of the spindle 69 is a capstan 75 for driving tape forwardly from the supply spool 21 to the take-up spool 23 at playback or recording speed. Associated with the capstan 75 is a pinch-roller 77 which is mounted on a pillar upstanding from a slide-member 79 on the top of the chassis 1. Slide member 79 is mechanically coupled to the main switch 11. By operating switch 11, as hereinafter described, slide member 79 is moved from the position shown in the drawings to a position wherein a section of tape between spools 21 and 23 is gripped between the capstan 75 and the pinch roller 77.

During operation in the forward direction at playback or recording speed the take-up spool 23 is rotated to take-up tape fed thereto by the capstan 75 and pinch roller 77. For effecting this rotation of the take-up spool 23 a roller 81 is mounted adjacent to a driving roller 83 on the take-up spindle 38. Roller 81 is mounted on the upper end of a spindle 85, which carries roller 73 at the lower end thereof. The spindle 85 is mounted on an arm 87 which is pivotally mounted below the chassis for movement between the position shown in the drawings and a position wherein the arm 87 is rotated in an anticlockwise direction and the roller 81 engages the driving roller 83. Anticlockwise movement of the arm 87 is effected by movement of the slide member 79 when the main switch 11 is moved to its "play" position.

For driving tape forwardly at high speed an intermediate roller 89, mounted on an upper end of a spindle 91, is provided adjacent to the driving roller 83 on the take-up spindle 38. Spindle 91 is rotatably supported on an arm 93 which is pivoted on a slide 97. At the lower end of spindle 91 is a roller 99 which engages flywheel 71. Movement of the main switch 11 to the fast forward position moves the slide 97 downwardly, as viewed in FIG. 2 and 3, to a position wherein the roller 89 engages the driving roller 83, engagement between roller 99 and the flywheel 71 being maintained during this movement.

For rewinding tape on the supply spool 21 a roller 101 is mounted on a further slide 103 which is moved downwardly, as viewed in the drawings, when the main switch 11 is moved to the "rewind" position. With the slide 103 moved to its downwards position the roller 101 engages the roller 89 and a driving roller 105 on the supply spindle 36.

When the machine is connected to the line L1, L2 an incoming ringing current causes the machine to perform a predetermined sequence of operations similar to those described in the above-mentioned applications. Thus, the machine is first switched to a "playback" mode, wherein the head 31 is connected to the input of the amplifier 33, the line L1, L2 is connected to the amplifier output, and an answering announcement recorded on a section of the tape is transmitted to the distant caller. At the end of the announcement the machine is switched to a "record mode," wherein the line L1, L2 is connected to the amplifier input, the head 31 is connected to the amplifier output, and an incoming message from the caller is recorded on a succeeding section of tape. It is to maintain synchronism between the position of the tape vis a vis the head 31 and the electrical connections between the amplifier 33, the head 31 and the line L1, L2 that the machine is provided with the switching mechanism 37.

Referring to FIGS. 3 and 4, the switching mechanism includes a switching element in the form of a cam-shaft 107. This shaft is coupled via bevel gears 109, an intermediate shaft 111, gears 113, a shaft 115 and gears 117 to the spindle 36 for the supply spool. Coupling between the cam-shaft 107 and the spindle 36 is maintained throughout operation of the machine, i.e., during operation as a telephone answering machine and during operation and as a tape recorder in the "forward," "fast forward" and "rewind" mode of operation. Once the cassette 19 is mounted on the tape deck 9 the angular position of the shaft 107 is therefore cynchronised with the angular position of the spindle 36, and hence with the section of tape adjacent to the head 31, at all times during subsequent operation of the machine.

For providing indication of the angular position of camshaft 107 an indicator wheel 119 is mounted on a shaft 107. Marked areas of the wheel 119 represent "record" and "playback" modes, respectively. Adjacent to the wheel 119 there is a marker 125 on the casing 3, the area of the wheel adjacent to the marker at any time indicating the mode in which the machine is then operating.

For effecting the above-mentioned changes in the electrical connections to amplifier 33 a cam 127 is mounted at the end of cam-shaft 107 remote from the gears 109. Associated with the cam 127 is a cam-follower in the form of a shaft 129 which has one end thereof slidably supported in a bearing plate 131 and the other end thereof slidably received within a hollow end section 133 of a second shaft 135. A tension spring 137 extends between the follower 129 and the chassis 1 and urges the shaft 129 towards engagement with the cam 127. With the main switch in the "stop" condition, as shown in the drawings, however, the shaft 129 is held out of engagement with the cam 127 by a link 139, which engages an arm 141 projecting from the shaft.

The end of the link 139 remote from the arm 141 is connected to a lower end of a rocker arm 143, pivotally mounted on a support 145 which depends from the chassis 1. The upper end of the rocker arm 143 is secured to the slide member 79. Operation of the main switch 11 to move the slide member 79 downwardly, as viewed in FIGS. 2 and 3, causes the rocker arm 143 to rotate about its pivot on the support 145. This causes the lower end of the arm 143 to move upwardly, as viewed in the above figures, to a position wherein the link 139 is disengaged for the arm 141.

A its end remote from the shaft 129 and the shaft 135 has a section of reduced diameter which is supported in a bearing 147. Depending from the shaft 135 is a leg 149 which is formed with a slot 151 at its lower end. A pin 153, which is engaged in the slot 151, is mounted on one limb of a bifurcated member 155, the other limb of which member engages an operating member of a switch for amplifier 33.

The member 155 is pivotally mounted on a support 157, with its upper end projecting upwardly through respective apertures in the chassis 1 and slide member 79 and located immediately below an aperture in a leaf spring 159. One end of the leaf spring is secured to the upper surface of the slide member 79 and the other, free end thereof supports the record button 13.

When the record button 13 is depressed the upper end of the member 155 is engaged with the aperture in the leaf spring 159 and is moved downwardly, as viewed in FIGS. 2 and 3, when the main switch 11 is moved to its "play" position. This causes the lower end of the member 155 to move upwardly, switching the amplifier connections to the "record" mode. The aperture in the slide member 79 is such that movement of the slide member does not cause movement of the member 155 when the record button 13 is not depressed.

Pivotally mounted on the shaft 129 is a rocker arm 161, depending from which is a pin 163. The pin 163 is engaged in an elongated slot in a member 165, which is connected to the operating member of the selector switch 17. With the switch 17 in its "normal" position, shown in the drawings, the slotted member 165 holds the rocker arm 161 in an anticlockwise position wherein a finger 167 on the rocker arm engaged a stop 169 on the chassis 1. Engagement between the finger 167 and the stop 169 prevents axial movement of shaft 129 when the link 139 is disengaged from the arm 141 by moving the main switch 11 to the "play" position.

Formed in the shaft 129 is a groove 171 which is engaged by a second finger 168 on the arm 161 when the arm is rotated in a clockwise direction by moving the switch 17 to the "answer" position, thereby moving slotted member 165 to the left, (as viewed in FIG. 3). When the finger 168 is engaged in the groove 171 the shafts 129 and 135 are locked together. Accordingly, if the main switch 11 is now moved to the "play" position so that the link 139 is disengaged from the arm 141 the spring 137 is able to move the shafts 129 and 135 axially into engagement with the cam 127.

To prevent depression of the record button 13 when the machine is being used for telephone answering purposes an interlock is provided between the selector switch 17 and the record button. The interlock consists of a rocker 173 which is pivotally mounted below the chassis 1. One end of the rocker 173 is engaged by a portion of the slotted member 165, which rotates the rocker in an anticlockwise direction (as viewed in FIG. 3) when the selector switch 17 is moved from the position shown in the drawings to the "answer" position. Coupled to the other end of the rocker 173 is a link 175 which has an upstanding section 177 at one end thereof projecting upwardly through an aperture in the chassis. Anticlockwise rotation of the rocker 173 moves the section 177 downwardly, (as viewed in FIG. 2), to a location immediately below the record button 13, thereby preventing depression of the button.

When the machine is not in use the main switch 11 is in the "stop" position and the selector switch 17 is in its "normal" position, as shown in the drawings. The head 31, the speaker 35 and the microphone socket 25 are then connected to the amplifier switches.

To record an announcement a microphone is connected to the socket 25, the record button 13 is depressed, and the main switch 11 is moved to the "-play" position.

Depressing the record button 13 moves down the leaf spring 159 so that the aperture therein embraces the upper end of the member 155. Accordingly, when the main switch 11 is moved to the "play" position, thereby moving the slide member 79 and the leaf spring 159 downwardly, as viewed in FIGS. 2 and 3, there is a corresponding movement of the upper end of the member 155. This rotates the member 155 about its pivot and causes this lower end to move upwards, as viewed in FIGS. 2 and 3. The shaft 135 therefore slides along shaft 129, which remains stationary. The leg 149 moves with shaft 135 and, by virtue of the engagement of pin 153 in slot 151 causes the amplifier connections to be switched to the "record" mode, i.e., the microphone is connected to the amplifier input and the head 31 to the amplifier output.

Downwards movement of the slide member 79 also rotates arm 143, which moves link 139 upwards, as viewed in FIGS. 2 and 3. This disengages the link 139 from the arm 141, though the latter is retained in the position shown by stop 169. Switch 49, which is mechanically coupled to the switch 11, closes when switch 11 is closed. The motor 43 is therefore energized, capstan 75 is therefore rotated. In addition, movement of the slide member 79 also moves the head 31 into engagement with the tape and moves the pinch roller 77 into a position wherein the tape is gripped between this roller and the rotating capstan 75. Tape is therefore driven from the supply spool 21 to take-up spool 23 and the user records his message by speaking into the microphone.

During this forward movement of the tape the camshaft 107 is rotated, as is the indicator wheel 119 mounted thereon. The user is therefore provided with a visual indication of the period when a section of tape reserved for telephone answering announcements is passing the recording head 31. He can therefore time his announcements accordingly.

After recording a series of announcements at spaced intervals along a tape the user moves the switch 11 back to the "stop" position. Slide member 79 is thereby moved back to the position shown in the drawings, disengaging the head 31 from the tape, opening switch 49 to cut off the supply of current to the motor 43, disengaging the pinch roller 77 from the tape, moving link 139 into engagement with the arm 141, and rotating the member 155 so that the amplifier is returned to the "playback" mode.

To rewind tape on the supply spool 21 the user moves the switch 11 to the "rewind" position. This closes the electrical switch 49 to supply current to the motor 43 and moves the slide 103 to a position wherein roller 101 engages rollers 89 and 105. Drive is then transmitted from motor 43 to the spindle 36 supporting the supply spool 21 and tape is therefore drawn from the take-up spool 23 to the supply spool 21. At the end of re-winding the main switch 11 is returned to the "-stop" position.

To playback recorded announcements the selector switch 17 is retained in the "normal" position and the main switch 11 is moved to the "play" position, without depressing the "record" button 13.

As a result, the slide member 79 is again moved down, as viewed in FIGS. 2 and 3 of the switch 49 is closed and electrical current is supplied to the motor 43, the head 31 is engaged with the tape, and the pinch roller 71 is engaged with the tape. Tape is therefore driven forwardly from the supply spool 21 to the take-up spool 23 in the manner described above. Since the "record" button 13 is not depressed the upper end of the member 155 is not engaged in the aperture in the leaf spring 159. The member 155 is therefore not moved with the slide member 79 and the connections of the head 31 and the microphone to amplifier 33 remain in the "playback" mode. As the tape passes the head 31 the recorded messages are reproduced via the head, amplifier 33 and the speaker 35.

After playing back a series of announcements the tape is rewound on the supply spool 21 in the manner described above.

At any time during the recording or playing back of announcements the tape can be driven forwardly at high speed by moving the switch 11 from the "play" position to the "fast forward" position, as described above. This enables the user to pass quickly over unwanted sections of the tape.

To set up the machine for answering a telephone the conductors L1 and L2 of the line are connected to the socket 27. The selector switch 17 is moved from the "-normal" position, shown in the drawing, to the "answer" position. This moves the slotted member 165 to the left, as viewed in FIG. 3, and rotates the rocker arm 161 in a clockwise direction so that the finger 168 engages the groove 171 of the shaft 129. In addition, the microphone socket 25 and the speaker 35 are disconnected from the amplifier switches whilst the head 31 and the secondary winding 65 of the line transformer are connected to the amplifier switches.

The main switch 11 is now moved to the "play" position. This closes switch 49 and causes the slide member 79 to move downwardly, bringing the head 31 and pinch roller 71 into engagement with the tape, as described above. Movement of the selector switch 17 to the "answer" position has opened the switch 47 of FIG. 5 so that there is no supply of current to the motor 43.

Movement of the slide member 79 also rotates the member 165 so that the link 139 is moved axially and upwardly, as viewed in FIGS. 2 and 3. This allows the spring 137 to move the shaft 129 and the shaft 135, which is locked to shaft 129 by rocker arm 161, upwardly into engagement with cam 127.

With the tape fully rewound on the supply spool 21 and the indicator wheel 119 showing that the beginning of a section of tape bearing an announcement is adjacent to the head 31 the cam 127 is in such a position that upwards movement of shaft 129 causes the end of the shaft to engage one of the outstanding sections of the cam. The cam 127 therefore maintains the shaft 129, shaft 135 and leg 149 in positions corresponding to the "playback" mode of the amplifier 33.

When there is an incoming ringing current on the line L1, L2 each pulse of current closes the relay contacts 55, thereby causing motor 43 and amplifier 33 to be energized. Each time the motor 43 is energized the rotary element 59 of the switch 57 is rotated through a small angle. After a predetermined number of small rotations the switch 57 is closed, thereby providing a continuous path for current to the motor 43 and the amplifier 33 via the closed switches 49 and 55.

With motor 43 energized tape is driven in the forward direction from the supply spool 21 to the take-up spool 23 by the capstan 75. Rotation of the spool 21 is accompanied by rotation of the indicator wheel 119 and the camshaft 107.

During an initial period of rotation the shaft 129 engages an outstanding section of cam 127 so that the amplifier 33 is in the "playback" mode. A recorded announcement on the tape is therefore transmitted via the head 31 and amplifier 33 to the line transformer. At the end of this period, when the end of the answering section of tape reached the head 31, the cam 127 reaches a position wherein the shaft 129 is able to move upwardly, as viewed in FIGS. 2 and 3, into engagement with a depression in the cam. This movement is accompanied by rotation of member 155, causes the amplifier 33 to be switched to the "record" mode, whereby the caller can record his message on the succeeding section of tape.

At the end of the recording period the cam 127 returns the shaft 129 to a position corresponding to the "playback" mode of the amplifier 33. At the same time the switch 57 opens to cut off the supply of current to the amplifier 33 and the motor 43. The machine is then ready to receive a further call.

It will be noted that the selector switch 17 can only be moved between the "normal" and "answer" positions if the main switch 11 is in the "stop" position. If the main switch is in the "play" position the member 165 engages the member 179 to prevent operation of the selector switch 17.

It will be noted that the shaft 129 is disengaged from the cam 127 at all times except when the machine is in a condition suitable for connection to the line L1, L2, i.e., when the selector switch 17 is in its "answer" position and the main switch 11 is in its "play" position. This means that throughout other forms of operation the additional loading on spool 21 as a result of including the switching mechanism 37 in the machine is that involved in rotating shaft 107. Though the switching mechanism 37 is disengaged during these other forms of operation the camshaft 107 remains in cynchronism with the spool 21, As soon as the switching mechanism 37 is re-engaged by engaging shaft 129 with the cam 127, the switching mechanism assumes a condition corresponding to the angular position of the shaft 107 at that time.

Figure 6:
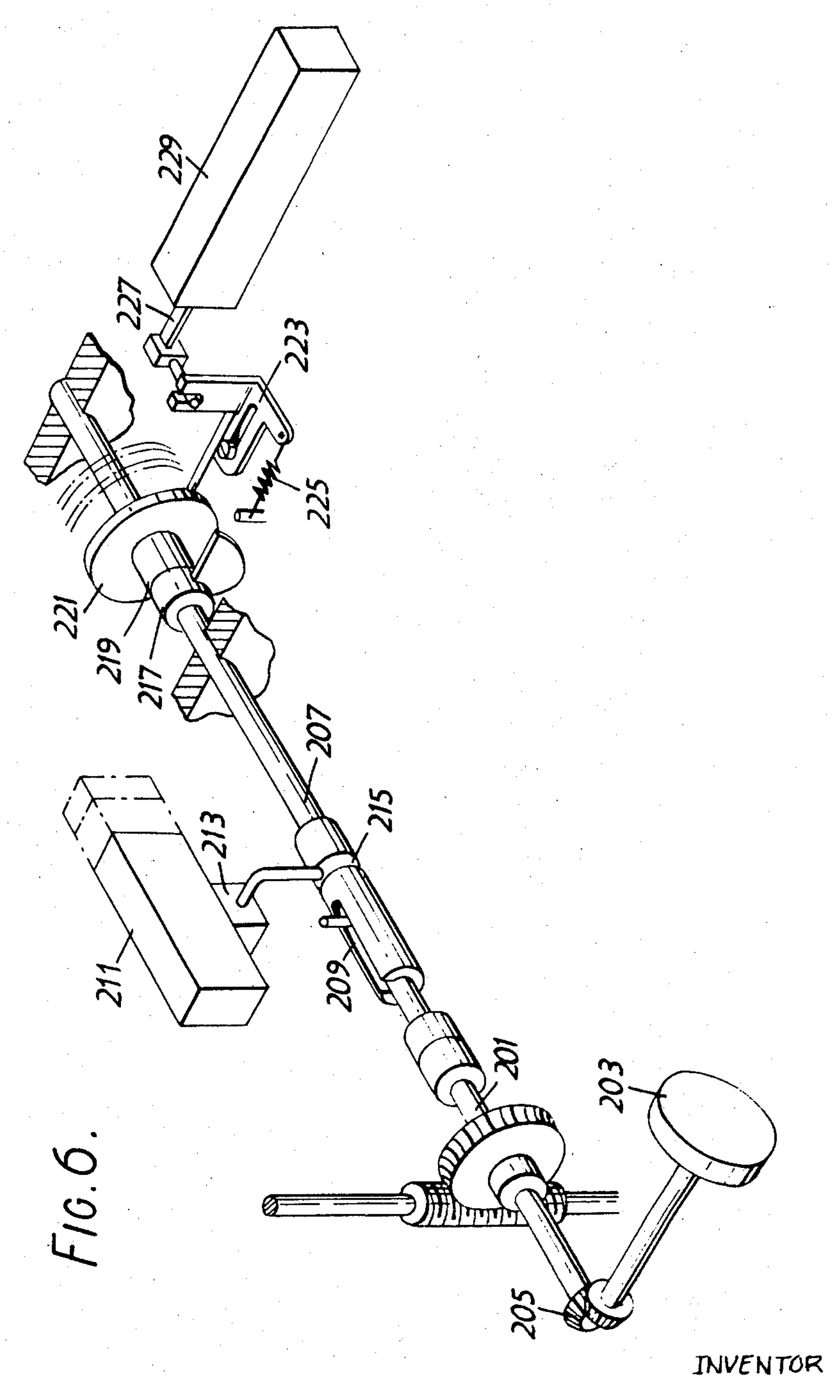
FIG. 6 is a diagrammatic perspective view of a part of a second telephone answering machine according to the invention.

FIG. 6 shows part of a second telephone answering machine according to the invention.

Referring to this figure, a shaft 201 is coupled to either the supply or the take-up spool of the machine for rotation in synchronism with the movement of the tape throughout all operations. An indicator wheel 203 is coupled to the shaft 201 by means of bevel gears 205 and provides a visual indication of the angular position of the shaft 201 at all times.

Axially aligned with the shaft 201 is a switching shaft 207. Shafts 201 and 207 are coupled together by means of a pin and slot connection 209 which ensures that the two shafts always rotate in unison but which allows axial movement of shaft 207 relative to shaft 201. Such movement is effected by operation of a three position selector switch 211 whose operating member 213 has a finger projecting therefrom into a circumferential groove 215 in the shaft 207.

Mounted on the switching shaft 207 are three cams, 217, 219 and 221, Cam 221 is a disc of large diameter and cam 219 is an adjacent disc of small diameter. Cam 217 has a short sector of diameter equal to the diameter of cam 221 and the remainder of diameter equal to the diameter of cam 219.

Associated with cams 217, 219, and 221 is a slidable arm 223 which is biassed towards shaft 207 by a spring 225. An operating member 227 of a switch 229 is coupled to the arm 223 for movement therewith in directions perpendicular to the axis of shaft 207. Switch 229 is a record/playback switch which determines the mode in which the machine is operating. Thus, with the arm 223 engaging the cam 219 or the section of cam 217 whose diameter is equal to the diameter of cam 219 the machine is in the "record" mode. With the arm 223 engaging the cam 221 or the section of cam 217 whose diameter is equal to the diameter of cam 221 the machine is in the "playback" mode.

To operate the machine for playing back recorded announcements or messages the operating member 213 of switch 211 is moved to the position shown in FIG. 6, where arm 223 engages cam 221. To record announcements the operating member 213 is moved a short distance to the right, as viewed in FIG. 6, thereby moving the shaft 207 axially with respect to the arm 223 so that the arm engages cam 219. To set up the machine to answer a telephone the operating member 213 is moved further to the right so that the arm 223 engages the cam 217. Upon energization of the tape-driving means (not shown) the shaft 207 is rotated and cam 217 reciprocates arm 223 to move switch 229 between "record" and "playback" conditions in synchronism with the passage of tape past the recording and playback head of the machine.

In the machine of FIG. 6 the arm 223 is engaged with one or other of the cams 217, 219 and 221 throughout all forms of operation of the machine. It is only when the machine is operated in the telephone answering mode, however, that there is any reciprocation of the arm 223 to impose loading on the shaft 107.

It will be appreciated that other apparatus in which a predetermined sequence of switching operations is performed in synchronism with the movement of a tape from a supply spool to a take-up spool can be provided with a switching mechanism which is coupled to the supply or take-up spool in the manner of the switching mechanisms described above.

It will also be appreciated that other forms of releaseable coupling between the switching mechanism and the rotary switching element can be used in place of the cam 127 and shaft 129 which couple the rotary switching element (shaft 107) to the switching mechanism 37 of FIGS. 1 to 5. For example, there may be provided a Bowden cable whose inner wire engages a cam on the rotary element, a microswitch operated by a cam on the rotary element or a reciprocating gear in the form of a shaft formed with a double helix engaged by an element which, upon rotation of the shaft, is caused to reciprocate axially of the shaft.

I claim:

1. A sound recording and reproducing machine comprising means for supporting supply and take up spools for magnetic tape, a sound recording and reproducing head, an amplifier, at least one electrical switch for selectively connecting the amplifier to the head for operation between recording and playback modes, a tape driving mechanism comprising a first tape driving means adapted to drive tape forwardly from the supply spool to the take up spool via the sound recording and reproducing head at a speed suitable for recording and reproducing information on the tape, a second tape driving means adapted to drive tape from one spool to the other at a higher speed, a first manually operable control for selectively actuating the first and second tape driving means, a switch actuating mechanism comprising a switching cam coupled to one of the spools to rotate in synchronism with the movement of tape past the head, a cam follower arranged to releasably engage the cam, means for mechanically coupling the cam follower to the electrical switch, and means interconnecting the first control and the switch actuating mechanism so that when the first tape driving means is actuated the cam and the cam follower are engaged, whereby the cam follower is reciprocated and causes the electrical switch to switch the amplifier between the record and playback modes in synchronism with the movement of tape past the head and when the second tape driving means is actuated the cam and the cam follower are disengaged and there is no switching of the amplifier.

2. A sound recording and reproducing machine as claimed in claim 1, wherein the cam follower is slidable lengthwise thereof between a position wherein the cam follower engages the cam and a disengaged position, and the interconnecting means is adapted to maintain the cam follower in the disengaged position when the second tape driving means is actuated.

3. A sound recording and reproducing machine as claimed in claim 1, wherein the cam is slidable laterally thereof between a position wherein the cam is engaged by the cam follower and a disengaged position, and the interconnecting means is adapted to maintain the cam in the disengaged position when the second tape driving means is actuated.

4. A sound recording and reproducing machine as claimed in claim 1, wherein the first tape driving means includes a capstan and a pinch roller between which the tape is engaged when the first tape driving means is actuated.

5. A sound recording and reproducing machine as claimed in claim 1, wherein the tape driving mechanism further comprises a single motor for selectively driving the first and second tape driving means.

6. A sound recording and reproducing machine as claimed in claim 1, wherein means are provided for connecting a telephone line to the amplifier, and the electrical switch is adapted to connect the telephone line to the amplifier input and the head to the amplifier output and to reverse these connections.

7. A sound recording and reproducing machine as claimed in claim 1, further including means for providing a visual indication of the angular position of the cam.

8. A sound recording and reproducing machine as claimed in claim 7, wherein the visual indicating means comprises an indicator wheel which is coupled to the cam.

9. A sound recording and reproducing machine as claimed in claim 10, comprising a second manually operable control which is movable between normal and operative positions, and means coupling the second control to the switch actuating mechanism so that when the second control is in the normal position thereof the cam and the cam follower are also disengaged from one another when the first tape driving means is actuated by the first control.

10. A sound recording and reproducing machine as claimed in claim 9, comprising a third manually operable control movable between record and playback positions, and means coupling the third control to the switch actuating mechanism so that the amplifier is maintained in the record mode when the third control is in the record position thereof, the second control is in the normal position thereof, and the first tape driving means is actuated by the first control.

11. A sound recording and reproducing machine as claimed in claim 10, wherein the cam follower is slidable lengthwise thereof between a position wherein the cam follower engages the cam and a disengaged position, the interconnecting means is adapted to maintain the cam follower in the disengaged position when the second tape driving means is actuated, the means for mechanically coupling the cam follower to the electrical switch comprises an intermediate member slidable relative to the cam follower, means are provided for locking together the cam follower and the intermediate member, the means coupling the second control to the switch actuating mechanism is adapted to operate the locking means so that the cam follower and the intermediate member are locked together when the second control is in the operative position thereof, whereby the cam follower and the intermediate member are reciprocated in unison to switch the amplifier between the record and playback modes when the first tape driving means is actuated, whereas the intermediate member is slidable relative to the cam follower when the second control is in the normal position, and the third control is coupled to the intermediate member so that movement of the first control to actuate the first tape driving means when the third control is in the second position thereof slides the intermediate member relative to the cam follower to effect switching of the amplifier to the record mode.

12. A sound recording and reproducing machine as claimed in claim 11, wherein the locking means comprises a locking member pivotally mounted on the cam follower and movable by the second control between a position wherein the locking member engages a cooperating part of the intermediate member and a position wherein the locking member is disengaged from the cooperating part.

* * * * *